United States Patent
Arndt et al.

(10) Patent No.: US 6,422,609 B1
(45) Date of Patent: Jul. 23, 2002

(54) FLUID JOINT

(75) Inventors: John J. Arndt, Romeo, MI (US); Jeremy T. Henderson, London (CA)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/475,581

(22) Filed: Dec. 30, 1999

Related U.S. Application Data

(60) Provisional application No. 60/150,025, filed on Aug. 20, 1999.

(51) Int. Cl.[7] .................................................. F16L 33/00
(52) U.S. Cl. ........................................................ 285/256
(58) Field of Search ............................... 285/256, 53, 54

(56) References Cited

U.S. PATENT DOCUMENTS

| | | | |
|---|---|---|---|
| 1,592,175 A | | 7/1926 | Boyd |
| 2,465,669 A | | 3/1949 | Tudor ........................... 285/17 |
| 2,850,299 A | | 9/1958 | Risley .......................... 285/48 |
| 3,930,676 A | | 1/1976 | Adams ........................ 285/253 |
| 4,538,837 A | | 9/1985 | Cronk .......................... 285/55 |
| 5,207,460 A | * | 5/1993 | Oetiker ................... 285/256 X |
| 5,553,896 A | * | 9/1996 | Woodward .............. 285/256 X |
| 5,622,394 A | * | 4/1997 | Soles et al. ................. 285/256 |
| 5,884,945 A | * | 3/1999 | Bader et al. ............ 285/256 X |
| 6,016,842 A | * | 1/2000 | Rooke .................... 285/256 X |

FOREIGN PATENT DOCUMENTS

| | | | | |
|---|---|---|---|---|
| DE | 94 11 779 U | | 10/1994 | |
| EP | 0255393 | * | 2/1988 | ................. 285/256 |
| EP | 0 530 404 A | | 3/1993 | |
| JP | 53068421 | * | 11/1976 | ................. 285/256 |

* cited by examiner

Primary Examiner—Lynne H. Browne
Assistant Examiner—David E. Bochna
(74) Attorney, Agent, or Firm—Young & Basile, P.C.

(57) ABSTRACT

A fluid joint of the type including a generally rigid metallic tube having an annular bead spaced from the free end of the tube to define a pilot portion between the bead and the tube free end, a generally flexible hose sized to fit at a free end thereof over the pilot portion, and a metallic ferrule crimped at a first end thereof over the hose free end and adapted to be crimped at a second end thereof over the tube pilot portion. The joint further includes an elastomeric ring positioned in surrounding relation to the tube pilot portion between the bead and the second end of the ferrule so that, as the second end of the ferrule is crimped against the tube pilot portion, the elastomeric ring is trapped between the second end of the ferrule and the bead to preclude the entry of contaminants into the interface between the tube and the ferrule so as to discourage corrosive galvanic action between the dissimilar materials of the ferrule and the tube.

26 Claims, 2 Drawing Sheets

FLUID JOINT

This application benefit of Prov. No. 60/50,025 filed Aug. 20, 1999.

BACKGROUND OF THE INVENTION

This invention relates to fluid joints and more particularly to fluid joints utilizing a crimped ferrule to facilitate the formation of the joint.

It is often necessary, for example in the assembly of a motor vehicle to provide a fluid joint between a relatively rigid tube and a relatively flexible hose. It is common practice, for example, to form such a joint by the use of a ferrule coacting with an upset or bead formed on the tube at a location spaced from a free end of the tube to define a pilot portion between the bead and the tube free end for insertion into the free end of the hose. The joint is formed by inserting the pilot portion of the tube into the free end of the hose and crimping the ferrule at one end to the free end of the hose and at its other end to the pilot portion of the tube proximate the bead. Whereas this arrangement provides satisfactory fluid connection between the tube and the hose there is a tendency for galvanic action to occur between the dissimilar metallic materials of the ferrule and the tube at the interface of the ferrule and the bead with the result that corrosion may form at this location with consequent degradation of the joint.

SUMMARY OF THE INVENTION

This invention is directed to the provision of an improved fluid joint;

More particularly, this invention is directed to discouraging corrosion in a fluid joint of the type employing dissimilar metallic members.

The invention concerns a fluid joint of the type including a generally rigid metallic tube having an annular bead spaced from a free end of the tube to define a pilot portion between the bead and the tube free end, a generally flexible hose sized to fit at a free end thereof over the tube pilot portion, and a metallic ferrule crimped at a first end thereof over the hose free end and crimped at a second end thereof over the tube pilot portion.

According to the invention, the joint further includes an elastomeric ring positioned in surrounding relation to the tube pilot portion between the bead and the second end of the ferrule. The elastomeric ring provides a seal between the ferrule and the bead to keep out contaminants such as water, salt, or dirt that may promote corrosion at the interface between the ferrule and the bead. The ring further provides isolation between the ferrule and the bead.

The invention further provides a method of providing a fluid joint between a generally rigid metallic tube and a generally flexible hose.

According to the invention methodology, an annular bead is provided on the tube spaced from a free end of the tube to define a pilot portion between the bead and the tube free end; a metallic ferrule is provided having first and second ends; the first end of the ferrule is crimped over the free end of the hose; an elastomeric ring is provided; the ring is positioned in surrounding relation to the tube pilot portion; the tube pilot portion is inserted into the second end of the ferrule and into the free end of the hose to press the ring against the bead; and the second end of the ferrule is crimped to the tube pilot portion proximate the bead to trap the ring between the second end of the ferrule and the bead. This simple methodology provides a joint in which contamination or corrosion is discouraged at the interface of the ferrule and the bead.

In the disclosed embodiment of the invention, the step of positioning the ring in surrounding relation to the pilot portion includes positioning the ring against the bead. Positioning the ring against the bead prior to insertion of the tube pilot portion into the second end of the ferrule insures proper positioning of the ring in the final configuration of the joint.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
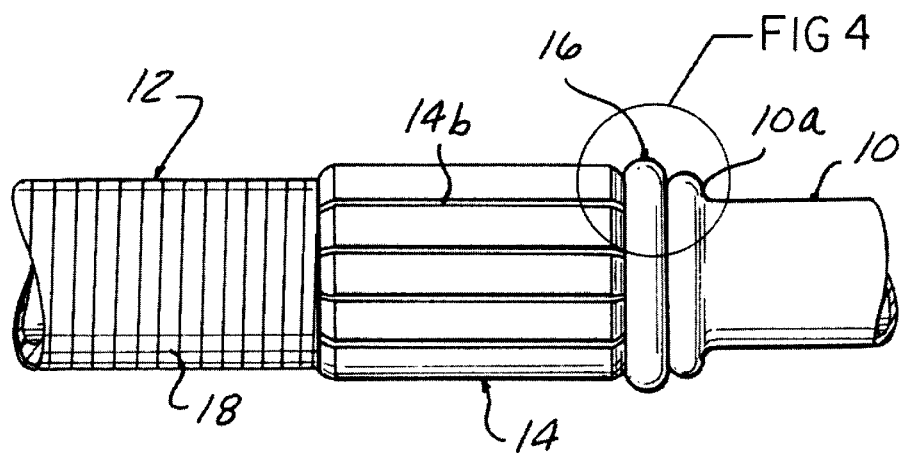
FIG. 1 is an assembled view of a fluid joint according to the invention.
Figure 2:
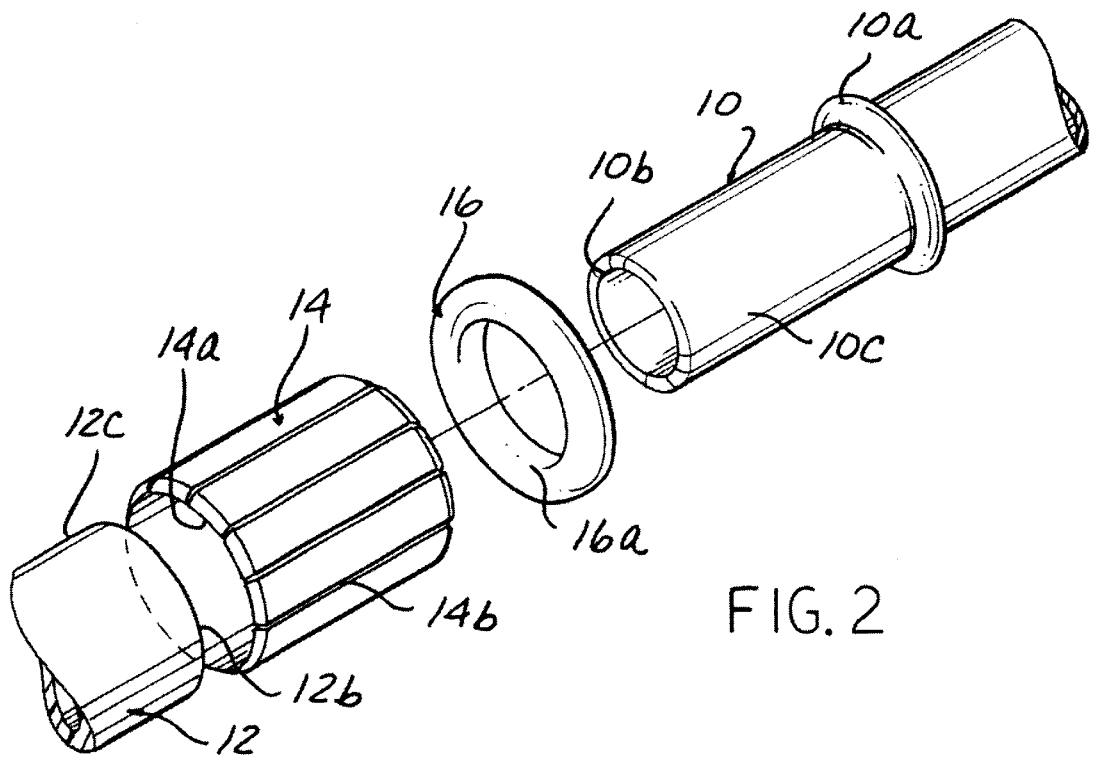
FIG. 2 is an exploded view of the invention joint.

The fluid joint of the invention is useful in any scenario where it is desired to form a fluid joint between a generally rigid metallic tube and a generally flexible hose. For example, modern day motor vehicles typically employ such a joint at each location where it is desired to establish a fluid tight joint between a relatively rigid metallic tube member and a relatively flexible hose member.

The fluid joint of the invention includes a tube 10, a hose 12, a ferrule 14, and a ring 16.

Tube 10 may for example constitute a brake line tubing in a motor vehicle and may comprise a steel tube having an aluminum coating. An upset or bead 10a is formed in the tube at a location spaced from the free end 10b of the tube whereby to define a pilot tube portion 10c between the bead and the tube free end.

Hose 12 may be formed, for example, of a tough insoluble polymer such as Teflon® and may include a reinforced steel wire braid 18 encircling the hose. Hose 12 is generally flexible and has an inner diameter 12a approximating the outer diameter 10d of tube pilot portion 10c so that pilot portion 10c may be inserted into the free end 12b of the hose to provide a friction sealing interface between the outer diameter of the tube pilot portion and the inner diameter of the hose.

Ferrule 14 has a tubular configuration and may be formed for example of stainless steel. Ferrule 14 has an inner diameter 14a approximating the outer diameter 12c of the hose and exceeding the outer diameter 10d of the tube pilot portion. Ferrule 14, in known manner, includes longitudinal creases 14b to facilitate crimping.

Ring 16 is formed of an elastomeric material and may comprise what is commonly identified as an O-ring. Ring 16 has an inner diameter 16a approximating the outer diameter 10d of the tube pilot portion so that it may be readily slipped over the tube pilot portion.

Figure 3:
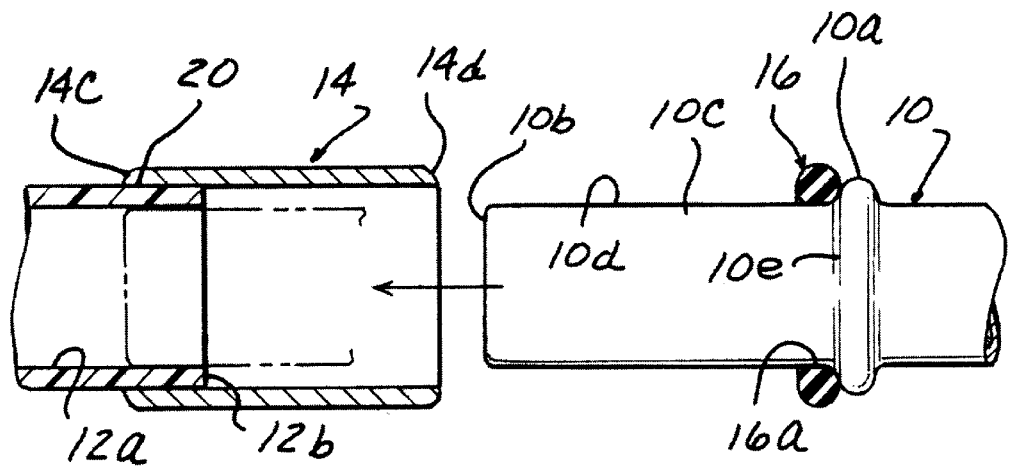
FIG. 3 is a view showing the assembly methodology of the joint.
Figure 4:
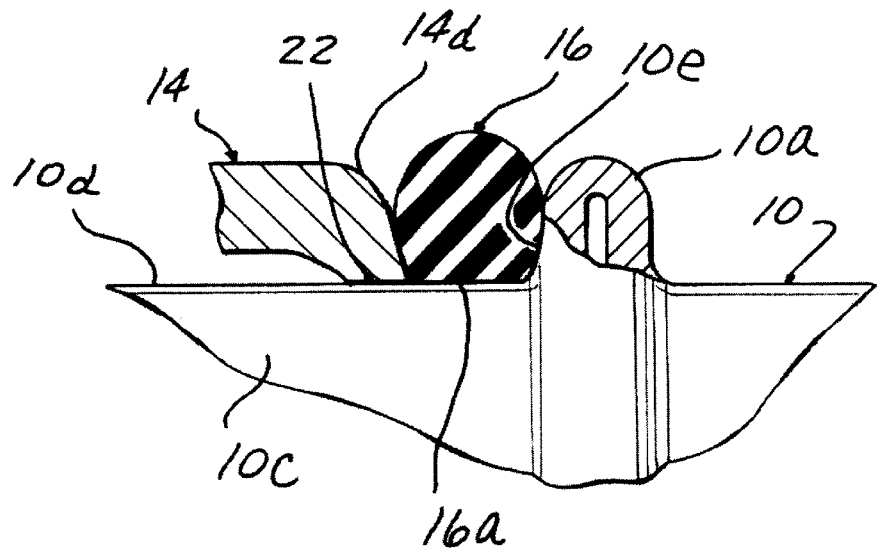
FIG. 4 is a detail view taken within the circle 4 of FIG. 1.

To assemble the invention joint (FIG. 3.), first ferrule end 14c is crimped at 20 over the free end 12b of hose 12; ring 16 is slipped over tube pilot portion 10c and into abutting engagement with the inboard face 10e of bead 10a; tube 10, carrying ring 16, is inserted into ferrule 14 and into tube 12 to insert the free end lob of the tube pilot portion 10c into the free end 12b of the hose in sealing fashion and to position the second end 14d of the ferrule in abutting engagement with ring 16 (FIG. 4); and second ferrule end 14d is crimped at 22 against the outer diameter lod of the tube pilot portion to trap the ring 16 between the inboard annular face 10b of the bead and the crimped ferrule end 14d.

In the assembled configuration of the joint, ring 16 precludes the entry of contaminants such for example as water, salt, and dirt into the interface between the dissimilar metals of the tube 10 and the ferrule 14 whereby to preclude galvanic or battery action as between the dissimilar metals of the ferrule and the tube and thereby preclude corrosion.

The invention will be seen to provide an improved fluid joint which is simple in construction and assembly and which operates to effectively preclude corrosion at the interface of dissimilar metals utilized in the formation of the joint.

Whereas a preferred embodiment of the invention has been illustrated and described in detail it will be apparent that various changes may be made in the disclosed embodiment without departing from the scope or spirit of the invention.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A fluid joint comprising:
   a generally rigid metallic tube having an annular bead spaced from a free end of the tube to define a pilot portion between the bead and the tube free end;
   a generally flexible hose sized to fit at a free end thereof over the tube pilot portion, said hose made of a material suitable for use in a brake line;
   a metallic ferrule crimped at a first end thereof over the hose free end and crimped at a second end thereof into contact with the tube pilot portion, wherein the ferrule is made of a metallic material dissimilar to the metallic material of the tube; and
   an elastomeric ring positioned in surrounding relation to the tube pilot portion and held against the bead by the crimped second end of the ferrule, wherein the elastomeric ring precludes the entry of contaminants to discourage galvanic action at the junction of the ferrule and the tube.

2. A method of providing a fluid joint between a generally rigid metallic tube and a generally flexible hose comprising the steps of:
   providing an annular bead on the tube spaced from a free end of the tube to define a pilot portion between the bead and the tube free end;
   providing a metallic ferrule having first and second ends, wherein the ferrule is made of a metallic material dissimilar to the metallic tube;
   positioning the ferrule over the free end of the hose;
   crimping the first end of the ferrule over the free end of the hose;
   providing an elastomeric ring;
   positioning the ring in surrounding relation to the tube pilot portion and against the annular bead;
   inserting the tube pilot portion into the second end of the ferrule and into the free end of the hose to press the ring against the bead; and
   crimping the second end of the ferrule to the tube pilot portion proximate the bead while in contact with the ring to trap the ring between the second end of the ferrule and the bead for preventing the entry of contaminants between the ferrule and the ring.

3. A method according to claim 2 wherein the step of positioning the ring in surrounding relation to the tube pilot portion comprises positioning the ring against the bead.

4. A fluid joint comprising:
   a generally rigid metallic tube having an annular bead spaced from a free end of the tube to define a pilot portion between the bead and the free end of the tube;
   a generally flexible hose having a free end sized to fit over the pilot portion of the tube;
   a metallic ferrule made of a dissimilar metallic material from the tube, the ferrule crimped at a first end over the free end of the hose for sealing engagement with respect to the pilot portion of the tube and crimped at a second end into contact with the pilot portion of the tube; and
   single means, positionable encircling the pilot portion of the tube between the bead of the tube and the second end of the ferrule, for preventing galvanic action between the dissimilar metallic materials of the tube and ferrule.

5. The fluid joint of claim 4 further comprising:
   the tube made of steel material.

6. The fluid joint of claim 5 further comprising:
   the steel tube having a surface coating.

7. The fluid joint of claim 6 further comprising:
   the coating on the steel tube including aluminum.

8. The fluid joint of claim 4 further comprising:
   the hose made of an insoluble polymer.

9. The fluid joint of claim 8 further comprising:
   the hose made of an insoluble polymer including Teflon.

10. The fluid joint of claim 4 further comprising:
    a reinforced metallic wire braid encircling the hose, such that the metallic wire braid is in electrical communication with the metallic tube through the metallic ferrule.

11. The fluid joint of claim 10 further comprising:
    the metallic wire braid made of steel.

12. The fluid joint of claim 4 further comprising:
    the ferrule including longitudinally extending creases for facilitating crimping.

13. The fluid joint of claim 4 further comprising:
    the single means for preventing entry of contaminants between the tube and the ferrule.

14. A fluid joint comprising:
    a generally rigid metallic tube having an annular bead spaced from a free end of the tube to define a pilot portion between the bead and the free end of the tube, the tube having a coating including aluminum;
    a generally flexible hose having a free end sized to fit over the pilot portion of the tube;
    a metallic ferrule made of a dissimilar metallic material from the tube, the ferrule crimped on top of the free end of the hose for sealing engagement with respect to the pilot portion of the tube; and single means, positionable encircling the pilot portion of the tube between the bead of the tube and the second end of the ferrule, for preventing galvanic action between the dissimilar metallic materials of the tube and ferrule.

15. A method for forming a fluid joint comprising the steps of:

positioning single means to be encircling a pilot portion of a tube and into engagement with an annular bead formed on the tube, the tube being made of generally rigid metallic material and having the annular bead spaced from a free end of the tube to define the pilot portion between the bead and the free end of the tube;

positioning a metallic ferrule made of a dissimilar metallic material from the tube on a generally flexible hose having a free end sized to fit over the pilot portion of the tube; and crimping the ferrule at a first end over the free end of the hose for sealing engagement with respect to the pilot portion of the tube and crimping the ferrule at a second end into contact with the pilot portion of the tube, while the single means is interposed between the bead of the tube and the second end of the ferrule for preventing galvanic action between the dissimilar metallic materials of the tube and ferrule.

16. The method of claim 15 wherein the tube is made of steel material.

17. The method of claim 16 wherein the steel tube has a surface coating.

18. The method of claim 17 wherein the coating on the steel tube includes aluminum.

19. The method of claim 15 wherein the tube is made of an insoluble polymer.

20. The method of claim 19 wherein the insoluble polymer includes Teflon.

21. The method of claim 15 wherein the hose is reinforced with a metallic wire braid encircling the hose, such that the metallic wire braid is in electrical contact with the metallic tube through the metallic ferrule.

22. The fluid joint of claim 21 wherein the metallic wire braid is made of steel.

23. The method of claim 15 wherein the ferrule includes longitudinally extending creases for facilitating crimping.

24. The method of claim 15 further comprising the step of:
preventing entry of contaminants between the tube and the ferrule with the single means.

25. A method for forming a fluid joint comprising the steps of:

positioning single means to be encircling a pilot portion of a tube and into engagement with an annular bead formed on the tube, the tube being made of generally rigid metallic material and having the annular bead spaced from a free end of the tube to define the pilot portion between the bead and the free end of the tube, wherein the tube has a coating including aluminum;

positioning a metallic ferrule made of a dissimilar metallic material from the tube on a generally flexible hose having a free end sized to fit over the pilot portion of the tube; and crimping the ferrule on top of the free end of the hose for sealing engagement with respect to the pilot portion of the tube, while the single means is interposed between the bead of the tube and the second end of the ferrule for preventing galvanic action between the dissimilar metallic materials of the tube and ferrule.

26. A fluid joint comprising:

a generally rigid metallic tube having an annular bead spaced from a free end of the tube to define a pilot portion between the bead and the tube free end, the metallic tube made of steel and having a coating including aluminum;

a generally flexible hose having a free end sized to fit over the pilot portion of the tube, the hose made of an insoluble polymer and a reinforced steel wire braid encircling the hose;

a metallic ferrule sheating a portion of the hose, the ferrule crimped at a first end over the free end of the hose and crimped at a second end into contact with the pilot portion of the tube, the ferrule formed of stainless steel having longitudinally extending creases to facilitate crimping, such that the tube is in electrical communication with the steel wire braid through the ferrule; and an elastomeric ring encircling the pilot portion of the tube and held against the bead by the crimped second end of the ferrule, such that the elastomeric ring precludes entry of contaminants to the junction of the ferrule and the tube while discouraging galvanic action therebetween.

* * * * *